United States Patent
Tallant et al.

(10) Patent No.: US 8,845,086 B2
(45) Date of Patent: Sep. 30, 2014

(54) PRINTING PROCESS, POLYMER AND INK

(75) Inventors: Neil Anthony Tallant, Manchester (GB); Neil James Thompson, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 0 days.

(21) Appl. No.: 13/697,586

(22) PCT Filed: May 12, 2011

(86) PCT No.: PCT/GB2011/050910
§ 371 (c)(1),
(2), (4) Date: Nov. 13, 2012

(87) PCT Pub. No.: WO2011/141744
PCT Pub. Date: Nov. 17, 2011

(65) Prior Publication Data
US 2013/0059131 A1  Mar. 7, 2013

(30) Foreign Application Priority Data

May 14, 2010 (GB) .................................. 1008081.0
Nov. 5, 2010 (GB) .................................. 1018702.9

(51) Int. Cl.
*B41J 2/01* (2006.01)
*C08G 73/02* (2006.01)
*B41J 2/21* (2006.01)
*C08G 65/333* (2006.01)
*C08G 73/06* (2006.01)
*C08G 75/02* (2006.01)
*C08G 75/12* (2006.01)
*C09D 11/326* (2014.01)
*C09D 179/02* (2006.01)
*C09D 179/04* (2006.01)

(52) U.S. Cl.
CPC ........... *C08G 73/0273* (2013.01); *B41J 2/2107* (2013.01); *C08G 65/33317* (2013.01); *C08G 73/0644* (2013.01); *C08G 75/02* (2013.01); *C08G 75/12* (2013.01); *C08G 2650/50* (2013.01); *C09D 11/326* (2013.01); *C09D 179/02* (2013.01); *C09D 179/04* (2013.01)
USPC ............................................. 347/100; 347/95

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101
USPC ............ 347/100, 95, 96, 101, 102, 22, 20, 9; 106/31.6, 31.27, 31.13; 523/160, 161
See application file for complete search history.

(56) References Cited

U.S. PATENT DOCUMENTS

| | | | |
|---|---|---|---|
| 2,945,762 A | 7/1960 | Carroll et al. | |
| 3,622,339 A | 11/1971 | Nishio et al. | |
| 4,314,001 A | 2/1982 | Wesseler | |
| 4,562,246 A | 12/1985 | Wang et al. | |
| 5,240,499 A | 8/1993 | Az et al. | |
| 6,316,619 B1* | 11/2001 | Miyake et al. | 544/198 |
| 6,767,090 B2* | 7/2004 | Yatake et al. | 347/100 |
| 2002/0128340 A1* | 9/2002 | Young et al. | 522/1 |
| 2003/0235706 A1 | 12/2003 | Sen | |
| 2006/0132565 A1* | 6/2006 | Szajewski et al. | 347/100 |
| 2008/0229974 A1* | 9/2008 | Uozumi et al. | 106/31.75 |
| 2008/0274284 A1 | 11/2008 | Fujimoto et al. | |
| 2009/0033844 A1 | 2/2009 | Ando et al. | |

FOREIGN PATENT DOCUMENTS

| | | |
|---|---|---|
| EP | 0 475 418 A2 | 3/1992 |
| EP | 0 484 832 | 5/1992 |
| EP | 0 537 837 | 4/1993 |
| EP | 1 702 960 A2 | 9/2006 |
| JP | 60-101539 | 6/1985 |
| JP | 62-132968 | 6/1987 |
| JP | 2-115279 | 4/1990 |
| JP | 2004-315716 | 11/2004 |
| JP | 2009-084345 | 4/2009 |
| JP | 2009-215455 | 9/2009 |
| WO | 97/26294 | 7/1997 |
| WO | 00/31069 | 6/2000 |
| WO | 01/25292 | 4/2001 |
| WO | 2002/060974 | 8/2002 |
| WO | 2005/005551 | 1/2005 |
| WO | 2008/107658 | 9/2008 |
| WO | 2011/141745 A2 | 11/2011 |

OTHER PUBLICATIONS

International Search Report dated Jul. 19, 2011, for International Application No. PCT/GB2011/050910.

* cited by examiner

*Primary Examiner* — Manish S Shah
(74) *Attorney, Agent, or Firm* — Morgan, Lewis & Bockius LLP

(57) ABSTRACT

A process for ink jet printing an image on a substrate is described, which includes applying to the substrate a composition including a liquid medium, a pigment and a polymer having a chain of the Formula (1) or a salt thereof:

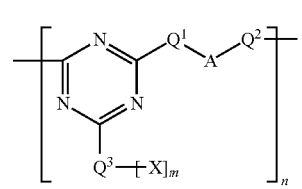

Formula (1)

wherein X, $Q^1$, $Q^2$, $Q^3$, A, m and n are as defined, and the polymer having a chain of Formula (1) or salt thereof is used to comminute the pigment.

12 Claims, No Drawings

PRINTING PROCESS, POLYMER AND INK

TECHNICAL FIELD

This invention relates to polymers containing a triazine chain structure, it further relates to dispersions and inks containing said polymer. It also relates to the process of ink jet printing said inks.

BACKGROUND

Inks are often of one of two types, depending on the type of colorant used. Dye-based inks often comprise a dye dissolved in a liquid medium. Pigment inks comprise a pigment dispersed in a particulate form in a liquid medium. Pigment inks tend to have better ozone-fastness and light-fastness than dye-based inks. However, because the pigment is in the form of fine particles there is a tendency for the particles to agglomerate or flocculate whilst the ink is being stored and/or whilst the ink is being used (e.g. printed). Such agglomeration or flocculation before the ink has been printed onto a substrate is highly undesirable, particularly in ink jet printing inks where the printer nozzles are very small and are susceptible to blockage by any oversized particulate matter. Thus, in the ink jet field a great deal of effort has been spent attempting to provide sub micron sized pigment dispersions and increase the colloidal stability of these pigment dispersions.

It is also desirable to provide pigment inks which offer high optical density (OD), especially when printed onto plain paper.

Pigment dispersions are often colloidally stabilised by means of a dispersant.

In our own studies on dispersant stabilised pigment inks we have found that it is particularly difficult to prepare inks which simultaneously exhibit good colloidal stability and high OD on plain paper. For example, we have found that dispersant stabilised pigment inks known in the art having a high colloidal stability provide a low OD when printed on to plain paper and vice versa.

We have also found that the few dispersant stabilised pigment inks which do provide inks exhibiting high OD when printed onto plain paper tend to also use dispersants which require significant and undesirably high amounts of organic solvent to assist in dissolving/dispersing the dispersant, for example in the pigment dispersion or comminution step.

Further it is desirable that a dispersant is effective in the comminution process. Quicker comminution (e.g. milling) to submicron particles sizes saves substantial energy and it may also result in less pigment particles having a particles size markedly smaller than the target size. Particles much below the target size are often referred to as fines.

Commercially, there still remains a need for dispersants which can be used to prepare pigment inks and which solve, at least in part, one or more of the abovementioned problems.

DETAILED DESCRIPTION

According to a first aspect of the present invention there is provided a process for ink jet printing an image on a substrate comprising applying to the substrate a composition comprising a liquid medium, a pigment and a polymer comprising a chain of the Formula (1) or a salt thereof:

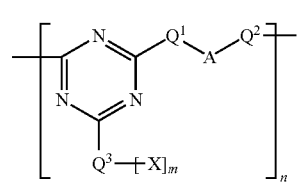

Formula (1)

wherein:
each X independently is an alkyl, aryl, or heterocyclyl group each of which may be optionally substituted;
each $Q^1$ and $Q^2$ independently is $NR^1$, O or S; wherein each $R^1$ independently is H or an optionally substituted alkyl, aryl or heterocyclyl group;
each A independently is an optionally substituted divalent organic linking group;
n is from 2 to 1,000
each m independently is 1 or 2;
in each case when m is 1, $Q^3$ independently is $NR^1$, O or S and each $R^1$ independently is H or an optionally substituted alkyl, aryl or heterocyclyl group; and when m is 2, $Q^3$ is N; and
the polymer having a chain of Formula (1) or salt thereof has been used to comminute the pigment.

Definitions

In this description the words "a" and "an" mean one or more unless indicated otherwise. Thus, for example, "a" polymer includes the possibility of there being more than one polymer, similarly "a" pigment includes the possibility of there being more than one kind of pigment.

Polymer

Preferably, the chain of Formula (1) is at least 50 wt % more preferably at least 70 wt % and especially at least 90 wt % relative to the total polymer composition. More preferably the chain is all of the polymer structure except the terminal groups. The remaining polymer chain when required to make things up to 100% may be a polyurethane or polyester chain.

The polymer structure may be branched but is preferably linear.

Depending on the method of preparation and the relative amounts of monomers used to prepare the polymer the terminal groups may be attached to triazine rings and/or $Q^2$ groups.

Terminal Groups

The chain of Formula (1) may be terminated in a number of ways.

The terminal group may be any monovalent group.

Typical terminal groups include H, OH, halogen, $C_{1-30}$ alkyl-NH—, $C_{1-30}$ alkyl-S—, $C_{1-30}$-alkyl-O—, phenyl-NH—, phenyl-S— and phenyl-O—.

Including terminal groups, examples of polymers having a chain of Formula (1) include those of Formulae (1a), (1b) and (1c):

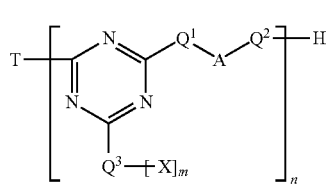

Formula (1a)

wherein
T is a terminal group selected from OH, halogen, $C_{1-30}$ alkyl-NH—, $C_{1-30}$ alkyl-S—, $C_{1-30}$-alkyl-O—, phenyl-NH—, phenyl-S— and phenyl-O-groups;

Formula (1b)

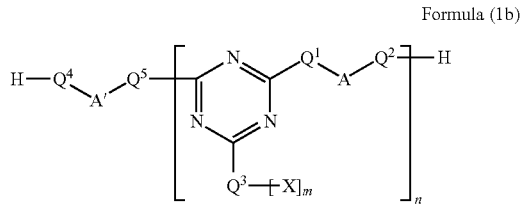

wherein
$Q^4$ and $Q^5$ are each independently $NR^1$, O or S; wherein each $R^1$ independently is H an optionally substituted alkyl, aryl or heterocyclyl group;
and A' is an optionally substituted divalent organic linking group;

Formula (1c)

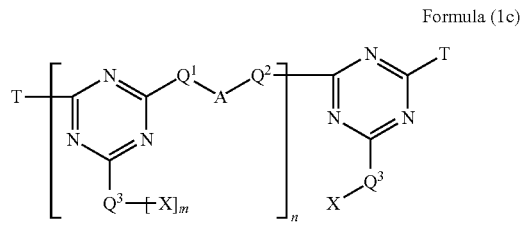

wherein each T independently is as described above.

In some cases it may be desirable to post react any halo-triazine groups which are used to prepare the polymer. Suitable post reaction agents include mono functional amines, thiols and alcohols. Of these mono-functional organic amines are preferred. In one preferred case mono thiols, mono alcohols and especially mono amines may be used as endcapping agents to provide the polymer of Formula (1c) wherein T=alkyl/aryl/cycloalkyl linked via an $NR^1$, S or O group to the triazine ring, wherein $R^1$ is as defined previously. Preferably T is $C_{1-20}$ alkyl/cycloalkyl-NH—.

In another preferred case a molar excess of the compound $HQ^1AQ^2H$ may be used to prepare the polymer, in which case the polymer is of the Formula (1b).

In one case, any remaining halo-triazine groups are allowed to hydrolyse with water to give OH groups. Accordingly, in one case all the T groups present are OH.

Water-Dispersing Groups

Preferably, the polymer chain has at least one water-dispersing group in its structure. Water-dispersing groups as defined herein mean those hydrophilic groups which aid in the dispersal or dissolution of the polymer in water. Preferred examples of water-dispersing groups include polyethyleneoxide ending in OH or $C_{1-6}$ alkyl, —$SO_2NH_2$, —OH, —$SO_3H$, —$CO_2H$ groups or phosphorus containing acids.

The acidic water dispersing groups —$SO_3H$, —$CO_2H$, and especially phosphorus containing acids are preferred.

Preferably, at least one of the water-dispersing groups present in the polymer chain is a phosphorus containing acid. In some cases all of the water-dispersing groups present in the polymer chain are phosphorus containing acids.

Preferred phosphorus containing acids include phosphoric acids including mono esters and polyphosphoric acids and phosphonic acids including mono esters and polyphosphonic acids. Of these —$OPO_3H_2$ (phosphoric acid) and most especially —$PO_3H_2$ (phosphonic acid) including salts thereof are preferred. We have found that phosphonic acid groups in particular tend to make the polymer more effective as a pigment dispersant and result in final inks which when printed have improved optical density (OD).

Preferably, the polymer has from 0.1 to 10, more preferably from 0.2 to 5, even more preferably from 0.5 to 3 and especially from 1 to 2 water-dispersing groups for every triazine ring which is present in the polymer structure.

Preferred sites for the attachment of water-dispersing groups include A, $R^1$, X, more preferably A and X, and especially X. Preferably, at least one water-dispersing group present in the polymer is attached to X. In some cases all of the water-dispersing groups which are present in the polymer are attached to X groups.

n

Preferably, n is from 2 to 500, more preferably from 2 to 100 and especially from 2 to 50.

In some cases n may be at least 3, more preferably at least 4 and even more preferably at least 5. Thus for example n may be from 3 to 1000, from 4 to 1000 or from 5 to 1000.

The value of n may be measured by any suitable technique. Preferred techniques include gel permeation chromatography, viscometry, vapour pressure osmometry, mass spectrometry and multiple angle laser light scattering.

A preferred technique is gel permeation chromatography. This is preferably performed using a water, THF or DMF solvent. The molecular weight is preferably established relative to polystyrene or more especially relative to poly(ethylene glycol) standards. To establish the value of n it is preferred to divide the number averaged molecular weight by the mass of the repeat unit expressed by formula (1) based on the specific monomers employed.

Chromophores

Preferably, the polymer used in the present invention comprises no chromophore groups. Preferably, the polymers comprise no chromophores having an absorption peak in the 350 to 750 nm wavelength range. In particular it is preferred that the polymer does not comprise any dye groups which are covalently bonded into the polymer structure. Examples of groups preferably absent include azo, xanthene, anthraquinone, triaryl methane, azine, thiazine, acridine, rhodamine, phthalocyanine and nigrosine groups. This allows the polymers in present invention to be used with any particulate solid without potentially disrupting the desired shade.

Physical Adsorption

In some cases the polymer is not permanently associated with the pigment. For example, in some cases the polymer is only physically adsorbed onto the pigment surface. Thus, the polymer is able to adsorb and desorb from the pigment surface. In some cases the polymer is not cross-linked.

$Q^1$, $Q^2$, $Q^4$ and $Q^5$

At least one, more preferably all of the groups $Q^1$ and $Q^2$ present in the polymer are of the Formula $NR^1$. The same preference is true for the groups $Q^4$ and $Q^5$ when present. This linkage is preferably formed via an amine/halo-triazine coupling reaction which tends to be particularly effective. When $R^1$ is optionally substituted alkyl, it is preferably optionally substituted $C_{1-20}$ alkyl.

When $R^1$ is an optionally substituted aryl group it is preferably an optionally substituted phenyl or naphthyl group.

When $R^1$ is optionally substituted heterocyclyl it may be aromatic (heteroaryl) or non aromatic. When $R^1$ is heterocyclyl it is preferably a 5- or 6-membered ring containing from 1 to 3 atoms selected from N, S and O in the ring.

Preferred examples of which include optionally substituted pyrrolyl, thiophenyl, furanyl, pyridyl, pyrimidyl, pyrazinyl, triazinyl, imidazolyl, thiazolyl, oxazolyl and pyrazolyl.

Optional Substituents

When $R^1$ is not H, the optional substituents for $R^1$ include —$NO_2$, CN, halo (especially Cl, F, Br and I), —NHC(O)$C_{1-6}$alkyl, —$SO_2NHC_{1-6}$alkyl, —$SO_2C_{1-6}$alkyl, —$C_{1-6}$alkyl optionally carrying an OH group, —$OC_{1-6}$alkyl optionally carrying an OH group, —$NHCONH_2$, —$OC(O)C_{1-6}$alkyl, polypropyleneoxide ending in OH or a $C_{1-6}$alkyl group, polyethyleneoxide ending in OH or a $C_{1-6}$ alkyl group, —OH, —$SO_3H$, —$PO_3H_2$, —$OPO_3H_2$, —$SO_2NH_2$ and —$CO_2H$.

The optional substituents for $R^1$ may also be used as optional substituents for any other group which mentions the possibility of being optionally substituted.

Most preferably $R^1$ is H.

$Q^3$

Preferably, at least one, more preferably all of the $Q^3$ groups are NH (m=1) or N (m=2). To put this another way the group $Q^3X_m$ is preferably —$NR^1X$ or —$NX_2$.

$R^1$ when present in $Q^3$ may be any of the abovementioned groups but is preferably H.

X

Generally speaking X may be any of the groups stated for $R^1$ including all of the substituents which may be present on $R^1$.

Preferably, at least one, more preferably most or all of the X groups have attached water-dispersing group(s), wherein the water-dispersing groups are as hereinbefore mentioned. Unless mentioned to the contrary the word attached as used herein means covalently bonded.

Preferably, at least one of the X groups, more preferably each X group independently has from 1 to 3, more preferably 1 or 2 water-dispersing groups.

Preferably these are phosphorus containing acid groups, more preferably —$OPO_3H_2$ or —$PO_3H_2$, most preferably —$PO_3H_2$ groups. We have found that phosphonic acid groups in this location in the polymer structure result in particularly good dispersant properties and inks which when printed offer high optical density (OD).

Preferred examples of X include phenyl, naphthyl, —$C_{1-20}$alkyl and 5- or 6-membered heteroaromatic groups containing from 1 to 3 N, S or O atoms in the ring; each of which being preferably substituted with from 1 to 3 —$PO_3H_2$ groups and optionally one or more substituents other than —$PO_3H_2$ groups.

When X is $C_{1-20}$ alkyl it is preferred that X is of the formula $C_{1-6}$alkyl-$PO_3H_2$. Suitable examples of X groups of this kind include *$CH_2PO_3H_2$, *$CH_2CH_2PO_3H_2$, *$CH_2CH_2CH_2PO_3H_2$, $CH_3CH*CH_2PO_3H_2$, *$CH_2CH_2CH_2CH_2PO_3H_2$ wherein the asterisk (*) represents the point of attachment to the $Q^3$ group.

When X is phenyl it is preferably of the Formulae (4a, 4b or 4c):

Formulae

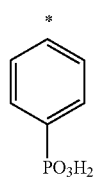
(4a)

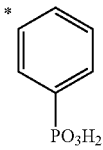
(4b)

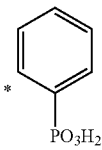
(4c)

wherein the asterisk (*) represents the point of attachment to the $Q^3$ group.

The group X may comprise both aromatic and aliphatic groups. For example X may be of the Formula (5a):

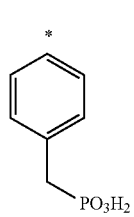
Formula (5a)

wherein the asterisk (*) represents the point of attachment to the $Q^3$ group.

The group X may also have two phosphonic acid groups. Suitable examples of which include those of Formulae (6a, 6b and 6c):

Formulae

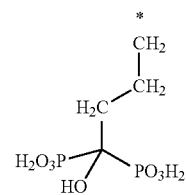
6a

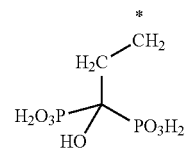
6b

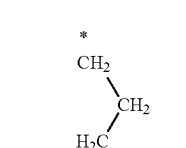
6c wherein the asterisk (*) represents the point of attachment to the $Q^3$ group.

The group X may also be of the Formulae (7a or 7b):

Formulae

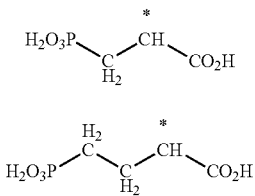

7a

7b wherein the asterisk (*) represents the point of attachment to the $Q^3$ group.

Most preferably at least one, more preferably all of the X groups is/are of the formula *$CH_2PO_3H_2$ where in the asterisk (*) represents the point of attachment to the $Q^3$ group.

In one case $Q^3$ is N, m=2, one of the X groups is *$CH_2CO_2H$ and the other X group is *$CH_2PO_3H_2$ wherein the asterisks represent the point of attachment to the N atom ($Q^3$). This is the glyphosate residue.

X may be of the formula *$CH_2CH_2SO_3H$ or *$CH_2CO_2H$ wherein the asterisks represent the point of attachment to $Q^3$ group. X may be a polyethyleneoxy chain ending in $C_{1-6}$ alkyl or OH.

$Q^3X$

Preferably at least one, more preferably most and especially all of the groups $Q^3(X)$, are of the formula —$NHCH_2PO_3H_2$ or —$N(CH_2PO_3H_2)_2$.

A and A'

The groups A and when present A' may be any divalent organic linking group.

A and A' may independently be an alkylene, a cycloalkylene, aromatic, or heterocyclic group. The heterocyclic groups may be aromatic or non-aromatic. The groups A and A' may be combinations of these. The groups A and A' may be interrupted by groups such as —O—, —NH—, —S—, —$CO_2$—, —NHCO—, —$SO_2$— and $NHSO_2$—. A and A' may be polymeric, for example A/A' may be an acrylic, styrenic, styrene-acrylic, polyester, polyurethane or polyether polymer. Preferably A and A' are an arylene, an alkylene or a combination thereof. A and A' may be optionally substituted with one of more or the optional substituents as mentioned for $R^1$. The groups A and A' may have one or more water-dispersing groups as hereinbefore mentioned. In some embodiments A and/or A' is/are unsubstituted.

When A or A' is arylene it is preferably divalent naphthylene or phenylene. When A is phenylene the linking groups to $Q^1$ and $Q^2$ may be arranged in an ortho, meta or para position. The same is possible for A' wherein the linking groups are now $Q^4$ and $Q^5$.

When A or A' is an alkylene group it is preferably a $C_{2-30}$ alkylene, especially a $C_{2-10}$ alkylene and most especially a $C_{2-6}$ alkylene. Preferred examples are $(CH_2)_4$ and $(CH_2)_6$. These may be branched or linear.

In one preferred embodiment A is xylylene *($CH_2$-phenylene-$CH_2$)*, preferably the $CH_2$ groups are in meta or para positions relative to each other. The asterisk (*) represents the point of attachment to the groups $Q^1$ and $Q^2$.

In view of the foregoing, preferably each A is independently selected from $C_{2-30}$ alkylene, a phenylene, a naphthylene and a xylylene group each of which may be optionally substituted.

We have found that when A is $(CH_2)_4$, $(CH_2)_6$ or A is p-xylylene the resulting polymers exhibit good dispersant properties and provide inks which when printed have good optical density. Preferably at least one, more preferably most and especially all of the A groups are selected from $(CH_2)_4$, $(CH_2)_6$ or p-xylylene.

Salts

The polymer as defined in the first aspect of the present invention may be present in the form of the free acid, the salt or a mixture thereof. Preferably, the polymer is at least partially, more preferably at least 50% in the form of the salt.

Preferred salts include those with the alkali metals (especially lithium, sodium and potassium), ammonia, organic amines and alkanolamines. Salts with organic quaternary amines and pyridinium are also possible.

Isomers

Whilst the polymer as defined in the first aspect of the present invention has been drawn in one formula the polymers and the scope of the claims are also intended to cover several isomers thereof including: tautomers, optical isomers, isotopic isomers and geometric isomers.

Preferred Polymers

According to a second aspect of the present invention there is provided a polymer comprising a chain of the Formula (2) or a salt thereof:

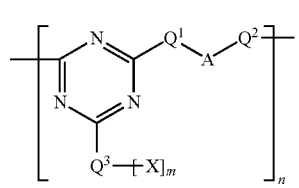

Formula (2)

wherein:
each X independently is an alkyl, aryl, or heterocyclyl group each of which may be optionally substituted;
each $Q^1$ and $Q^2$ independently is $NR^1$, O or S; wherein each $R^1$ independently is H or an optionally substituted alkyl, aryl or heterocyclyl group;
each A independently is an optionally substituted divalent organic linking group;
n is from 2 to 1,000
each m independently is 1 or 2; and
in each case when m is 1, $Q^3$ independently is $NR^1$, O or S and each $R^1$ independently is H or an optionally substituted alkyl, aryl or heterocyclyl group; and when m is 2, $Q^3$ is N;

said chain has one or more phosphonic acid groups in its structure.

The preferences for all these groups are as hereinbefore mentioned.

This polymer chain may be terminated as previously mentioned.

As mentioned above, we have found that the phosphonic acid group(s) in the polymer tends to improve the optical density obtained from prints with inks containing a pigment, a liquid medium and the above polymer according to the second aspect of the present invention.

Preferred Combinations

Preferably, all $Q^1$ and $Q^2$ groups are $NR^1$ wherein $R^1$ is H and at least one, more preferably all the $Q^3X_m$ groups are of the formula —$NHCH_2PO_3H_2$ or —$N(CH_2PO_3H_2)_2$.

More preferably, all the $Q^1$ and $Q^2$ groups are $NR^1$ wherein $R^1$ is H, at least one, more preferably all of the $Q^3X_m$ groups are of the formula —$NHCH_2PO_3H_2$ or —$N(CH_2PO_3H_2)_2$, all the A groups are selected from $(CH_2)_4$, $(CH_2)_6$ or p-xylylene. A' when present at the polymer termini is preferably the same as A. T when present at the polymer termini is preferably —OH.

Specific examples of preferred polymers include those having a chain of the Formulae (2a)-(2l):
Formula (2a)
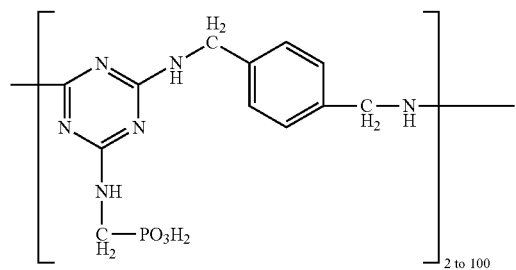
Formula (2b)
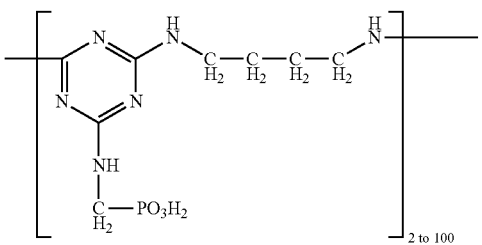
Formula (2c)
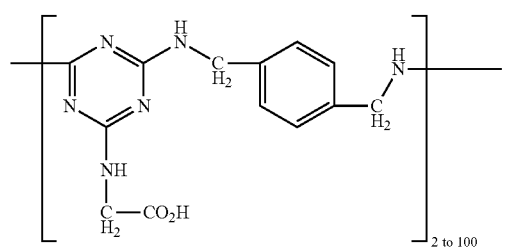
Formula (2d)
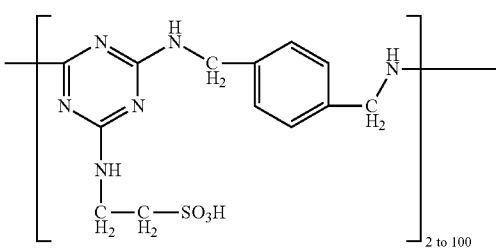
Formula (2e)
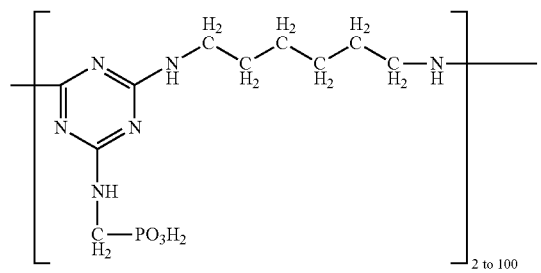
Formula (2f)
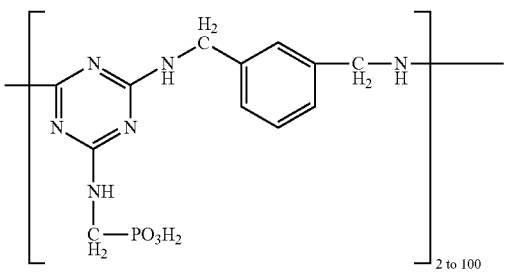
Formula (2g)
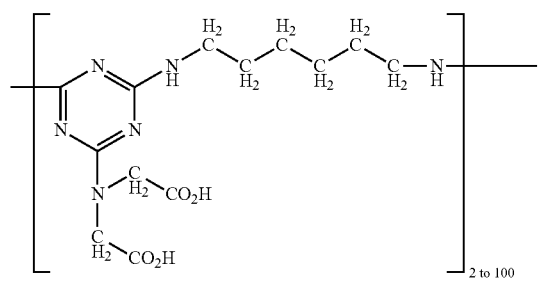
Formula (2h)
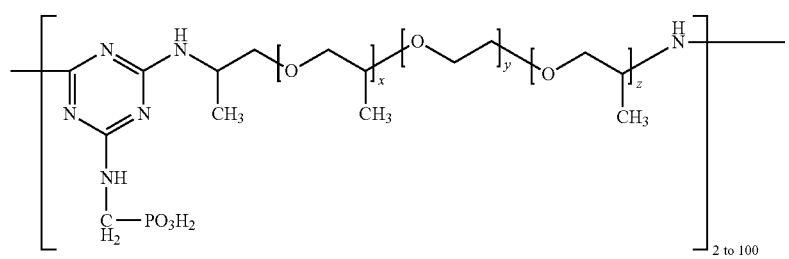
wherein y is about 9 and x + z is about 3.6

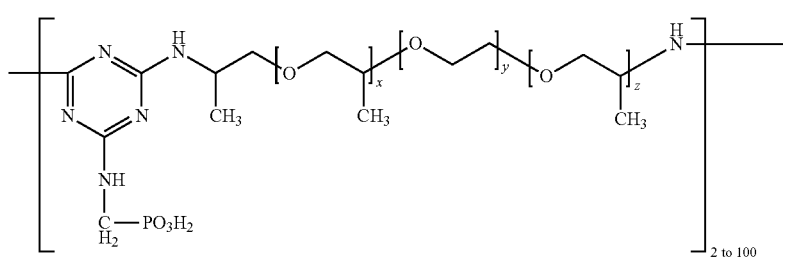

Formula (2i)

wherein y is about 12.5 and x + z is about 6.0

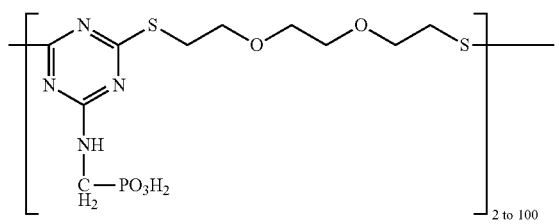

Formula (2j)

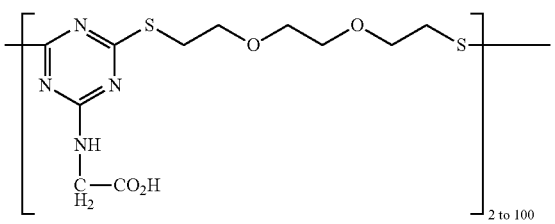

Formula (2k)

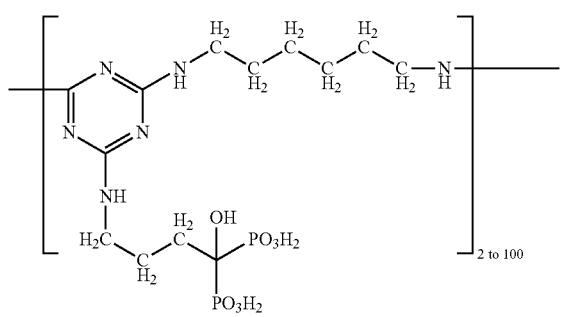

Formula (2l)

The polymers of Formula (2a) to (2l) may all be used in the first aspect of the present invention whilst only those having phosphonic acid groups are within the second aspect of the present invention.

Synthesis

In a third aspect of the present invention there is provided a process for preparing a polymer as defined in the second aspect of the present invention which comprises reacting in any order:

i) a compound of Formula (3);

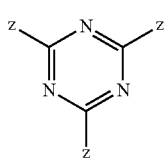

Formula (3)

wherein Z is a halogen atom;
ii) a compound of the formula $HQ^3X_m$; and
iii) a compound of the formula $HQ^1AQ^2H$ wherein A, X, $Q^1$, $Q^2$, $Q^3$ and m are as previously defined except that at least one of the groups A and X has a phosphonic acid group. Preferably X has at least one phosphonic acid group as previously mentioned.

Compounds of Formula (3)

The halogen atom for Z may be I, Br or F but is preferably Cl, accordingly the compound of Formula (3) is preferably cyanuric chloride.

In addition to the compound of Formula (3) the polymer chain may be prepared by additionally reacting relatively minor amounts of dihalopyrimidine compounds and/or 1,3-dintro-4,6-difluorobenzene.

Compounds of Formula $HQ^3X_m$

The compound of formula $HQ^3X_m$ preferably has at least one, more preferably 1 or 2 water-dispersing groups.

When the water-dispersing groups are carboxylic and/or sulfonic acid groups preferred compounds of formula $HQ^3X_m$ include taurine, sulfanilic acid, glycine and beta alanine.

The compound of formula $HQ^3X_m$ preferably has at least one (more preferably 1 or 2) acids containing a phosphorus atom (especially phosphoric acid and phosphonic acid) groups.

Preferred examples of phosphonic acid containing compounds include aminomethylphosphonic acid, iminodi(methylphosphonic acid), N-methylaminomethylphosphonic acid, 2-aminoethylphosphonic acid, 3-aminopropylphosphonic acid, meta, ortho and para-aminophenylphosphonic acid, 4-aminobenzyl phosphonic acid, alendronic acid, pamidronic acid, neridronic acid, glyphosate, 2-amino-3-phosphono propionic acid, 2-amino-4-phosphono butyric acid and the like. Of these aminomethylphosphonic acid and alendronic acid are preferred.

In some cases the compound of formula $HQ^3X_m$ has no water-dispersing groups. Examples include $C_{1-6}$ alkyl amines and optionally substituted aryl amines.

In one case it is possible to use both a combination of compounds of formula $HQ^3X_m$, for example some of which contain no water-dispersing groups and some of which contain at least one water-dispersing groups. In this manner the hydrophilicity of the polymer can be tailored to provide best dispersant characteristics. When mixtures of compounds of formula $HQ^3X_m$ are used it is preferred that at least some of these compounds have at least one water-dispersing group.

Compounds of the Formula $HQ^1AQ^2H$

The compound of the formula $HQ^1AQ^2H$ is preferably a diamine of the formula $H_2N\text{-}ANH_2$.

The A group may have no water-dispersing groups in which case suitable examples of $HQ^1AQ^2H$ include ethylenediamine, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane, 1,12-diaminododecane, p-xylenediamine, m-xylylenediamine, p-phenylenediamine, m-phenylenediamine, 4,4'-Diaminodiphenyl sulfone, piperazine, 1-(2-aminoethyl)piperazine, 2-methylpentamethylenediamine (DYTEK A), 1,3-pentanediamine (DYTEK EP), bis(hexamethylene)triamine (DYTEK BHMT-HP), trimethylhexamethylenediamine, 1,2-diaminocyclohexane, 1,3-diaminocyclohexane, 1,4-diaminocyclohexane. Preferred examples of which include 1,4-diaminobutane, 1,6-diaminohexane and p-xylylene diamine.

Dihydrazides (e.g. adipic acid dihydrazide) and urea may also be used.

The compounds of Formula $HQ^1AQ^2H$ may have water-dispersing groups in which case suitable examples of $HQ^1AQ^2H$ include lysine, p-phenylenediaminesulphonic acid, m-phenylenediaminesulphonic acid, p-phenylenediaminedisulphonic acid, m-phenylenediameinedisulphonic acid and 4,4'-diaminodiphenylamine-2-sulphonic acid. The $HQ^1AQ^2H$ compound may also be a polyetherdiamine such as those marketed as JEFFAMINE® diamines (D, ED, EDR series) by Huntsman.

Of course, it is possible to prepare polymer chains containing mixtures of different A groups by using a mixture of different compounds of the formula $HQ^1AQ^2H$. In this manner the hydrophilicity of the polymer can be tailored to provide best dispersant characteristics.

The compound of Formula $HQ^1AQ^2H$ may be a diol. Any diol may be used without limitation and preferred diols are those often used in the preparation of polyesters and polyurethanes. Low molecular weight diols may be used, examples of which include ethylene glycol; propylene glycol; 1,3-propanediol; 1,4-butanediol; 1,5-pentanediol; 1,6-hexanediol; 1,2-hexadecanediol, 1,2-dodecanediol, glycerol monoesters or diesters of fatty acids (such as glycerol monooleate, glycerol monostearate and the like), neopentyl glycol; diethylene glycol; dipropylene glycol; 2,2,4-trimethyl-1,3-pentanediol; 1,4-cyclohexanedimethanol; hydroquinone; resorcinol; 4,4'-sulphonyldiphenol; bisphenol A; ethylene oxide and/or propylene oxide adducts of bisphenol A; and ethylene oxide and/or propylene oxide adduct of hydrogenated bisphenol A, trimethylolpropane, trimethylolethane, and mixtures thereof.

Oligomeric diols may be used. Preferred examples of which include polyester diols, polyether diols, acrylic diols and polycarbonate diols.

The compound of Formula $HQ^1AQ^2H$ may be a dithiol. As examples of dithiols there can be mentioned 1,2-ethanedithiol, 1,2-propanedithiol, 1,3-propanedithiol, 1,10-decanedithiol, dipentene dimercaptan, ethylcyclohexyl dimercaptan, 1,4-benzenedithiol, 1,3-benzenedithiol, 3,6-dioxa-1,8-octanedithiol, 4,4'-thiobisbenzenethiol and 1,2-benzenedithiol.

Synthetic Conditions

The process for preparing the polymer chain according to the third aspect of the present invention may be carried out in a number of ways, but three schemes are outlined below.

Scheme I

In scheme I the process for preparing the polymer chain comprises the steps:

i) reacting a compound of Formula (3) with a compound of Formula $HQ^3X_m$;
ii) reacting the product of step i) with a compound of Formula $HQ^1AQ^2H$;
iii) heating the product of step ii) so as to cause polymerisation;
iv) optionally end-capping or hydrolysing any remaining halotriazine groups.

Scheme II

In scheme II the process for preparing the polymer chain comprises the steps:

i) reacting a compound of Formula (3) with a compound of Formula $HQ^1AQ^2H$;
ii) reacting the product of step i) with a compound of Formula $HQ^3X_m$;
iii) heating the product of step ii) so as to cause polymerisation;
iv) optionally end-capping or hydrolysing any remaining halotriazine groups.

Scheme III

In scheme III the process for preparing the polymer chain comprises the steps:

i) reacting a compound of Formula (3) with a compound of Formula $HQ^1AQ^2H$;
ii) heating the product of step i) so as to cause polymerisation;
iii) reacting the product of step ii) with a compound of Formula $HQ^3X_m$;
iv) optionally end-capping or hydrolysing any remaining halotriazine groups.

In schemes I, II and III the preferred temperatures for step i), ii) and iii) are 0 to 20° C., 20 to 40° C. and 40 to 100° C. respectively.

In each step the reaction is preferably carried out in a liquid vehicle which is preferably aqueous, more preferably consists only of water. Organic liquid vehicles may also be used, suitable examples of which include N-methylpyrrolidone and sulfolane.

In each step the reaction is preferably maintained at a pH of from 4 to 10.

In scheme I, steps i) and ii) the pH is preferably from 4 to 8. In scheme I, step iii) the pH is preferably from 6 to 10.

In some cases it is preferable to use a molar excess of the compound of Formula $HQ^1AQ^2H$ to the compound of the Formula $HQ^3X_m$.

The end-capping reaction may be as hereinbefore described.

Preferred endcapping agents are $C_{1-20}$ alkyl or $C_{1-20}$ cycloalkyl mercaptans, alcohols and especially amines. Preferably the amines are primary amines.

Hydrolysis is preferably accomplished by choosing an aqueous liquid vehicle for the reaction (more preferably the liquid vehicle is only water) and heating the product of step iii) optionally whilst the liquid vehicle has an acidic or a basic pH. In practice the hydrolysis is preferably performed by using water as the liquid vehicle for step iii), adjusting the pH to 9 to 10 and heating at 60 to 100° C.

Ink Jet Printing

Ink jet printing in the process according to the first aspect of the present invention may be performed by any suitable ink jet printing technique. Preferred ink jet printers use thermal, piezo or acoustic heads to fire droplets of ink.

Substrate

The substrate used in the process according to the first aspect of the present invention may be of any kind without limitation. Preferred substrates include paper, plastic and textile materials.

Preferred substrates are papers, e.g. plain or treated papers, which may have an acid, alkaline or neutral character. The paper may have an ink jet receptor layer. The receptor layer may be of the swellable or porous kind. Examples of commercially available papers are as described in International patent Application No. WO 2007/148035, page 13, line 24 to the end of line 37, which are incorporated herein by reference thereto. Preferably, the substrate is a plain paper. Preferably, the substrate does not contain an ink fixative. Examples of ink fixatives which are preferably absent include cationic organic amines and cationic polymers.

Liquid Medium

The liquid medium used in the first aspect of the present invention may be wholly organic but preferably is or comprises water (i.e. is aqueous). Preferably, the liquid medium comprises water and one or more water-miscible organic liquids Preferred water-miscible organic liquids for inclusion into the liquid medium include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; water-miscible ethers, preferably tetrahydrofuran and dioxane; diols, preferably diols having from 2 to 12 carbon atoms, for example ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone.

Preferably, the liquid medium comprises water and 1 or more, especially from 1 to 3, water-miscible organic liquids.

The weight ratio of water to water-miscible organic liquid when both are present in the liquid medium is preferably from 99:1 to 5:95, more preferably 95:5 to 50:50, especially 95:5 to 70:30.

Preferably, the liquid medium has a viscosity of less than 30 mPa·s, more preferably less than 20 mPa·s and especially less than 10 mPa·s. The viscosity is preferably at least 2 mPa·s. Preferably, the viscosity is Newtonian. Preferably, the viscosity is measured at 25° C. Preferably, the viscosity is measured using a shear rate of 100 s$^{-1}$. The viscosity is preferably measured using a cone and plate geometry. A preferred apparatus for measuring the viscosity is a TA Instruments rheometer.

Pigment

The composition in the first aspect of the present invention comprises the liquid medium, the polymer having a chain of the Formula (1) or a salt thereof and a pigment.

The pigment may comprise and preferably is an inorganic or organic pigment material or mixture thereof which is insoluble in the liquid medium. By insoluble we mean having a solubility of no more than 1%, more preferably no more than 0.1% by weight in the liquid medium. The solubility is preferably measured at a temperature of 25° C. The solubility is preferably measured at a pH of 8. Preferably, the solubility is measured in water, more preferably deionized water.

The pigment may be organic or inorganic.

A preferred pigment is an organic pigment, for example any of the classes of pigments described in the Third Edition of the Colour Index (1971) and subsequent revisions of, and supplements thereto, under the chapter headed "Pigments". Examples of organic pigments are those from the azo (including disazo and condensed azo), thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Preferred organic pigments are phthalocyanines, especially copper phthalocyanine pigments, azo pigments, indanthrones, anthanthrones, and quinacridones.

Preferred inorganic pigments include carbon black (especially gas blacks), titanium dioxide, silicon dioxide, aluminium oxide, iron oxides and sulfides.

In the first aspect of the present invention the polymer having a chain of Formula (1) or salt thereof has been used to comminute the pigment. This results in a dispersion of the pigment in the liquid medium. The pigment particles are colloidally stabilised by the polymer. In this way the polymer is preferably at least partially adsorbed onto the pigment surface.

Any suitable pigment may be used without particular limitation. For ink jet especially suitable pigments are carbon blacks, C.I. Pigment Red 122, C.I. Pigment Blue 15:3 and C.I. Pigment Yellow 74. Of course there are many alternative pigments.

The pigment is preferably not surface treated so as to covalently bind water-dispersing groups onto its surface. Preferably, the pigment is not dispersible in water without the aid of a dispersant.

Preferably, the pigment in the dispersion has an average particle size of less than 1 micron, more preferably from 10 to 500 nm, especially from 30 to 300 nm and most preferably from 50 to 200 nm. The average particle size may be a Z or volume average size. The particle size may be measured by suitable techniques including laser light scattering.

Dispersions

By the word dispersions we include for example millbases, concentrated inks, inks, tints and diluted inks.

The polymers as defined in the second aspect of the present invention are especially useful for preparing pigment dispersions.

According to a fourth aspect of the present invention there is provided a dispersion comprising a polymer according to the second aspect of the present invention, a pigment and a liquid medium.

Dispersions according to the fourth aspect of the present invention are preferably prepared by comminuting a mixture comprising the polymer according to the second aspect of the present invention, the pigment and the liquid medium.

Preferably, the dispersion comprises:
 i) 0.1 to 40 parts of polymer, more preferably from 0.5 to 20 parts of polymer, according to the second aspect of the present invention;
 ii) 0.1 to 40 parts, more preferably from 1 to 20 parts of pigment;
 iii) 50 to 99.8 parts, more preferably from 60 to 98.5 parts of liquid medium wherein all parts are by weight.

Preferably, the sum of the parts i)+ii)+iii) is 100 parts. The pigment may be any of those previously mentioned.

Preferably, the amount of polymer expressed as a percentage of the amount of pigment present in the dispersion is from 1 to 150%, more preferably from 5 to 100%, especially from 5 to 40% and most especially from 10 to 30%.

Comminution as used herein means those dispersing processes which effectively reduce the particle size of the pigment particles. Examples of suitable comminution processes include microfluidizing, ultrasonication, homogenisation and especially milling. Bead milling is especially preferred. Comminution does not include for example stirring, blending and rolling which do not tend to reduce the pigment particle size to any appreciable extent.

Preferably, the average particle size of the pigment prior to comminution is greater than 1 micron.

Preferably, the average particle size of the pigment after comminution is from 10 to 500 nm, more preferably from 20 to 300 nm and especially from 50 to 200 nm. The average particle size is preferably the Z or volume (Mv) average particle size. The average particle size may be measured by any suitable technique but laser light scattering is particularly preferred. Preferred apparatus for measuring the average particle size include the Zetasizer™ 3000 from Malvern and the Nanotrac 150 obtained from Honeywell-Microtrac.

Preferably, the only dispersant present during the comminution step is the polymer as defined in the first aspect of the present invention or according to the second aspect of the present invention.

After comminution, it is possible to post add dispersants other than the polymer as defined in the first or according to the second aspect of the present invention, but preferably this is not done by further comminution process. Instead, such dispersants may be added by methods such as for example mixing, blending, stirring and the like.

Preferably, the polymer as defined in the first aspect or according to the second aspect of the present invention at least partially adsorbs onto the pigment surface.

The liquid medium during the comminution step may be as herein before described. That said, a particular advantage of the polymers according to the second aspect of the present invention is their ability to facilitate easy comminution without needing liquid media which contain large amounts of organic liquids.

Thus preferably, the liquid medium used for comminution comprises:
i) 80 to 100, more preferably from 90 to 100, especially from 95 to 100 and more especially from 99 to 100 parts of water; and
ii) 0 to 20, more preferably from 0 to 10, especially from 0 to 5 and more especially from 0 to 1 parts of one or more water-miscible organic liquids;

wherein the parts are by weight and the sum of the parts i) and ii) is 100.

Most preferably the liquid medium present during comminution comprises only water.

The dispersions according to the fourth aspect of the present invention are especially suited to the preparation of inks and especially ink jet printing inks. Thus, the inks and ink jet printing inks comprise a dispersion according to the fourth aspect of the present invention.

Purification of the Dispersion

Preferably, dispersions are purified prior to being formulated into an ink. The purification can be by any suitable method including microfiltration, deionizer resins, centrifugation followed by decantation and washing. A preferred method is membrane filtration especially ultrafiltration.

Inks

Preferably, the ink comprises:
i) 0.1 to 30 parts of polymer according to the second aspect of the present invention;
ii) 1 to 30 parts of a pigment;
iii) 60 to 98.8 parts of a liquid medium wherein all parts are by weight.

Preferably, the ink is an ink jet printing ink.

According to a fifth aspect of the present invention there is provided an ink jet printer ink comprising:
i) 0.1 to 15 parts of polymer according to the second aspect of the present invention;
ii) 1 to 15 parts of pigment;
iii) 70 to 98.8 parts of liquid medium wherein all parts are by weight.

Preferably, the sum of the parts i)+ii)+iii) is 100 parts.

The inks are often prepared from the dispersions according to the fourth aspect of the present invention. Thus, it is preferable that the ink comprises a dispersion according to the fourth aspect of the present invention which has been prepared by the above mentioned comminution process.

Preferably, the ink has a viscosity of less than 50 mPa·s, more preferably less than 30 mPa·s and especially less than 15 mPa·s, when measured at a temperature of 25° C. The preferences for measuring the viscosity are as hereinbefore mentioned.

Preferably, the ink has a surface tension of 20 to 65 dynes/cm, more preferably 30 to 60 dynes/cm, when measured at a temperature of 25° C. The surface tension is preferably measured using a Kibron AquaPi.

The pH of the ink is preferably from 4 to 11, more preferably from 7 to 10.

When the ink is to be used as ink jet printing ink, the ink preferably has a concentration of halide ions of less than 500 parts per million, more preferably less than 100 parts per million. It is especially preferred that the ink has less than 100, more preferably less than 50 parts per million of divalent and trivalent metals. Parts per million as used above refers to parts by weight relative to the total weight of the ink. These low concentrations of ions in the resultant ink can be achieved by the abovementioned purification step.

Preferably, the process for making the ink includes a step for removing particles having a particle size of more than 1 micron in diameter, for example by filtration or centrifugation. Preferably the ink has less than 10%, more preferably less than 2% and especially less than 1% by weight of particles having a size of greater than 1 micron in diameter.

The liquid medium may be as herein before described. Again the liquid medium is preferably aqueous.

Additives

Preferably, the ink further comprises one or more additives selected from viscosity modifiers, pH buffers, metal chelating agents, surfactants, corrosion inhibitors, biocides, dyes, water miscible organic solvent(s) and/or kogation reducing additives.

Cartridge

According to a sixth aspect of the present invention there is provided an ink jet printer cartridge, comprising a chamber and an ink according to the fifth aspect of the present invention wherein the ink is present in the chamber.

Ink Jet Printer

According to a seventh aspect of the present invention there is provided an ink jet printer comprising an ink jet printer cartridge according to the sixth aspect of the present invention.

Substrates Printed with an Ink Jet Printer Ink

According to an eighth aspect of the present invention there is provided a substrate printed with an ink jet printing ink according to the fifth aspect of the present invention.

Use

According to an ninth aspect of the present invention there is provided the use of a polymer according to the second aspect of the present invention for preparing an ink jet printing ink.

EXAMPLES

The present invention will now be illustrated by the following examples in which all parts are by weight unless stated to the contrary.

1. Dispersant Preparation 1.1 Preparation of Polymer Aqueous Solution (1)

Step i)

A suspension of cyanuric chloride (20 g, 108 mmol) in water (300 mL) and calsolene oil (3 drops) was stirred for 30 minutes at a temperature of from 0 to 5° C. in a reactor. The pH of the suspension was raised to 6.5 using saturated aqueous $K_2CO_3$.

Step ii)

A solution of aminomethanephosphonic acid (11.4 g, 100 mmol) in water (80 mL) was added portionwise to the reactor over 10 minutes. The reactor contents were stirred at a temperature of from 0 to 5° C. for a period of 4 hours whilst the pH was maintained in the range 6.5 to 7. The resulting mixture was filtered (Whatman GF/A) to remove any unwanted suspended solids.

Step iii)

A suspension of p-xylylenediamine (13.6 g, 100 mmol) in water (30 mL) was added to the filtrate prepared above in step ii) at a temperature of from 0 to 5° C. The resulting mixture was stirred for 16 hours, during which it warmed up to 20° C. The pH of the mixture was raised to 9.5 using solid $K_2CO_3$ and the mixture was stirred and heated at 70° C. for 4 hours and then allowed to cool down to 20° C.

Step iv)

The resulting suspension was dialysed to a conductivity of less than 100 microScm$^{-1}$ and the volume was reduced to give Polymer Aqueous Solution (1) with a solids content of 10.4% by weight.

1.2 Preparation of Polymer Aqueous Solutions (2)-(11)

Polymer aqueous solutions (2) to (11) were prepared in the same manner as Polymer Aqueous Solution (1) except that aminomethanephosphonic acid was replaced with an equimolar amount of the compound of Formula $HQ^3X_m$ in Table 1, and p-xylylenediamine was replaced with an equimolar amount of the compound of Formula $HQ^1$-A-$Q^2$H. In some cases two compounds of the Formula $HQ^3X_m$ were used in place of aminomethanephosphonic acid. In these cases the sum total molar amount of both compounds of the Formula $HQ^3X_m$ is equivalent to the molar amount of aminomethanephosphonic acid used in preparing Polymer aqueous solution (1). Thus, a 1:1 molar ratio of two compounds of the formula $HQ^3X_m$ in essence used 0.5× and 0.5× the molar amount of aminomethanephosphonic acid as in Polymer aqueous solution (1).

TABLE 1

| Polymer Aqueous Solution | $HQ^3X_m$ | $HQ^1$-A-$Q^2$H |
|---|---|---|
| (2) | Aminomethanephosphonic acid | 1,4-Diaminobutane |
| (3) | Glycine | p-Xylylenediamine |
| (4) | Taurine | p-Xylylenediamine |
| (5) | Aminomethanephosphonic acid | 1,6-Diaminohexane |
| (6) | Aminomethanephosphonic acid | m-Xylylenediamine |
| (7) | Iminodiacetic acid | 1,6-Diaminohexane |
| (8) | Aminomethanephosphonic acid | Jeffamine ED-600 |
| (9) | Aminomethanephosphonic acid | Jeffamine ED-900 |
| (10) | Aminomethanephosphonic acid | 3,6-Dioxa-1,8-octanedithiol |
| (11) | Glycine | 3,6-Dioxa-1,8-octanedithiol |
| (12) | Aminomethanephosphonic acid | 4,4'-Thiobisbenzenethiol |
| (13) | Aminomethanephosphonic acid + Glycine (1:1 molar ratio) | 1,6-Diaminohexane |
| (14) | Glycine | 1,6-Diaminohexane |
| (15) | Aminomethanephosphonic acid + Sodium alendronate (1:4 molar ratio) | 1,6-Diaminohexane |
| (16) | 4-Aminobenzoic acid | 1,6-Diaminohexane |

1.3 Preparation of Comparative Polymer Aqueous Solution (1)

Joncryl® 683 (BASF Performance Chemicals, 10 g) was ground to a fine powder and mixed with water (90 g). Solid KOH was added and the mixture was heated (50° C.) and homogenised with a high-shear mixer (Ultra-turrax T25, Ika) for 8 hours, with the pH maintained above 9 by the addition of small amounts of solid KOH. Water was also added occasionally to maintain the volume. The solution was filtered (Whatman GF/A) to give Comparative Polymer Aqueous Solution (1) with a total solids content of 6.6%.

2. Millbase Preparation 2.1 Black Millbase (1)

Step i) Preparation of a Premixture

Pigment powder (60 parts of NIPex® 170IQ Carbon Black pigment, ex Evonik Degussa), Polymer Aqueous Solution (1) (57.7 parts) and water (282.3 parts) were mixed together to form a premixture.

Step ii) Comminution Using Method A

The premixture as prepared in 2.1, step i) was transferred to a vertical bead mill containing 1 mm ceramic beads. The mixture was then comminuted (milled) for 1 hour. The milling beads were then separated from the milled mixture. This resulted in Black Millbase (1).

Step iii) Characterisation

The pigment particles in Black Millbase (1) had a Z-Average particle size of 129 nm. The Z-Average particle size was established for all dispersions (unless stated to the contrary) using a Zetasizer® 3000 obtained from Malvern. The proportion of polymer relative to the pigment in Black Millbase (1) was 10% by weight.

2.2 Black Millbase (2)

Step i) Preparation of a Premixture

Pigment powder (2.4 parts of NIPex® 170IQ Carbon Black pigment, ex Evonik Degussa), Polymer Aqueous Solution (1) (1.15 parts) and water (16.45 parts) were mixed together to form a premixture.

Step ii) Comminution Using Method B

The premixture prepared above in 2.2, step i) was then treated with ultrasound (Branson Digital Sonifier operating at 60% amplitude) at 5° C. for 10 minutes. This resulted in Black Millbase (2).

Step iii) Characterisation

The pigment particles in Black Millbase (2) had a Z-Average particle size of 128 nm. The proportion of polymer relative to pigment in Black Millbase (2) is 5% by weight.

2.3 Black Millbase (3)

Step i) Preparation of a Premixture

Pigment powder (90 parts of NIPex® 170IQ Carbon Black pigment, ex Evonik Degussa), Polymer Aqueous Solution (1) (86.5 parts) and water (423.5 parts) were mixed together to form a premixture.

Step ii) Comminution Using Method C

The premixture prepared in 2.3, step i) was transferred to a horizontal bead mill containing plastic milling beads and the mixture was milled for 3 hours.

The milling beads were then separated from the milled mixture, which was finally purified by means of ultrafiltration using a membrane having a 50 kD pore size. This resulted in Black Mill-base (3).

Step iii) Characterisation

The pigment particles in the resulting mill-base had a Z-Average particle size of 107 nm. The proportion of polymer relative to pigment in Black Millbase (3) was 10% by weight.

2.4 Black Millbases (4) to (25)

Black Millbases (4) to (25) were prepared according to Black Millbase (2) using the aqueous polymer solutions, the comminution methods and times as indicated in Table 2.

TABLE 2

| Black Millbase | Polymer Aqueous Solution | Comminution Method, Comminution Time | Wt % Polymer relative to pigment | Z-Average particle size |
|---|---|---|---|---|
| (4) | (1) | B, 5 mins | 10 | 108 nm |
| (5) | (1) | B, 10 mins | 20 | 101 nm |
| (6) | (2) | B, 5 mins | 5 | 98 nm* |
| (7) | (2) | B, 5 mins | 10 | 101 nm* |
| (8) | (2) | B, 50 mins | 20 | 86 nm* |
| (9) | (3) | B, 20 mins | 10 | 115 nm |
| (10) | (4) | B, 20 mins | 10 | 102 nm |
| (11) | (5) | B, 15 mins | 10 | 96 nm |
| (12) | (5) | B, 15 mins | 20 | 99 nm |
| (13) | (6) | B, 15 mins | 10 | 92 nm |
| (14) | (7) | B, 15 mins | 10 | 92 nm |
| (15) | (7) | B, 15 mins | 15 | 96 nm |
| (16) | (7) | B, 15 mins | 20 | 96 nm |
| (17) | (8) | B, 30 mins | 10 | 99 nm |
| (18) | (8) | B, 30 mins | 20 | 91 nm |
| (19) | (9) | B, 30 mins | 10 | 95 nm |
| (20) | (9) | B, 30 mins | 20 | 117 nm |
| (21) | (10) | B, 30 mins | 10 | 96 nm |
| (22) | (11) | B, 15 mins | 10 | 102 nm |
| (23) | (11) | B, 15 mins | 20 | 102 nm |
| (24) | (12) | B, 30 mins | 10 | 144 nm |
| (25) | (13) | B, 15 mins | 10 | 95 nm |
| (26) | (13) | B, 15 mins | 20 | 96 nm |
| (27) | (5) | C, 40 mins | 10 | 137 nm |
| (28) | (5) | C, 70 mins | 10 | 120 nm |
| (29) | (14) | B, 15 mins | 10 | 117 nm* |
| (30) | (14) | B, 15 mins | 20 | 101 nm* |
| (31) | (14) | B, 15 mins | 30 | 101 nm* |
| (32) | (15) | B, 15 mins | 10 | 94 nm* |
| (33) | (15) | B, 15 mins | 20 | 89 nm* |
| (34) | (16) | B, 30 mins | 20 | 117 nm |
| (35) | (5) | A, 1 hour | 10 | 122 nm* |
| (36) | (5) | A, 2.75 hours | 20 | 122 nm* |
| Comparative Black Mill-base (1) | Comparative Polymer Aqueous Solution (1) | B, 15 mins | 30 | 94 nm* |

*Indicates the Mv particle size as measured by a Nanotrac 150 obtained from Honeywell-Microtrac.

3. Preparation of Inks

Each of the Black Millbases was used to prepare an Ink having the following composition.

Ink Vehicle

| Pigment (solids) | 6 parts |
| 2-Pyrrolidone | 3.00 parts |
| Glycerol | 15.00 parts |
| 1,2 Hexane diol | 4.00 parts |
| Ethylene glycol | 5.00 parts |
| Surfynol ™ 465 | 0.50 parts |
| Pure water | sufficient to make 100 parts |

Surfynol$^{RTM}$ 465 is a surfactant available from Air Products.

6 parts of black pigment on an active or solids basis were used in all cases (approximately 60 parts of Black Millbase when the solids content is 10% by weight).

Using the above ink composition, for example, Black Millbase (1) was used to prepare Black Ink (1), Black Millbase (2) prepared Black Ink (2) etc.

4. Preparation of Prints

Each of the Inks described above in point 3 were printed onto plain (untreated) paper, namely Xerox 4200 and Canon GF500 paper. Printing was performed by means of an Epson SX100 series ink jet printer printing 100% blocks of black.

5. Measurement of Reflectance Optical Density

For each print the Reflectance optical density (ROD) was measured using a Gretag Macbeth key wizard V2.5 Spectrolino photodensitometer instrument, illuminated using a D65 light source at an observer angle of 2° and with no filter fitted. Measurements were taken at at least two points along the print and were then averaged.

6. Results of Optical Density Measurements

The results of the ROD measurements are summarised below in Table 3.

TABLE 3

ROD of Prints obtained from Inks

| Ink | Polymer Aqueous solution | ROD on Xerox 4200 | ROD on Canon GF500 |
|---|---|---|---|
| Black Ink (1) | Polymer Aqueous solution (1) | 1.35 | 1.35 |
| Black Ink (2) | Polymer Aqueous solution (1) | 1.37 | 1.36 |
| Black Ink (3) | Polymer Aqueous solution (1) | 1.31 | 1.31 |
| Black Ink (4) | Polymer Aqueous solution (1) | 1.38 | 1.35 |
| Black Ink (5) | Polymer Aqueous solution (1) | 1.28 | 1.26 |
| Black Ink (6) | Polymer Aqueous solution (2) | 1.34 | 1.36 |
| Black Ink (7) | Polymer Aqueous solution (2) | 1.30 | 1.28 |
| Black Ink (8) | Polymer Aqueous solution (2) | 1.27 | 1.21 |
| Black Ink (9) | Polymer Aqueous solution (3) | 1.27 | 1.28 |
| Black Ink (10) | Polymer Aqueous solution (4) | 1.24 | 1.24 |
| Black Ink (11) | Polymer Aqueous solution (5) | 1.34 | 1.32 |
| Black Ink (12) | Polymer Aqueous solution (5) | 1.30 | 1.28 |
| Black Ink (13) | Polymer Aqueous solution (6) | 1.34 | 1.33 |
| Black Ink (14) | Polymer Aqueous solution (7) | 1.25 | 1.25 |
| Black Ink (15) | Polymer Aqueous solution (7) | 1.24 | 1.24 |
| Black Ink (16) | Polymer Aqueous solution (7) | 1.20 | 1.22 |
| Black Ink (17) | Polymer Aqueous solution (8) | 1.29 | 1.29 |
| Black Ink (18) | Polymer Aqueous solution (8) | 1.23 | 1.24 |
| Black Ink (19) | Polymer Aqueous solution (9) | 1.27 | 1.27 |
| Black Ink (20) | Polymer Aqueous solution (9) | 1.23 | 1.25 |
| Black Ink (21) | Polymer Aqueous solution (10) | 1.32 | 1.30 |
| Black Ink (22) | Polymer Aqueous solution (11) | 1.27 | 1.28 |
| Black Ink (23) | Polymer Aqueous solution (11) | 1.22 | 1.24 |
| Black Ink (24) | Polymer Aqueous solution (12) | 1.31 | 1.33 |
| Black Ink (25) | Polymer Aqueous solution (13) | 1.31 | 1.31 |
| Black Ink (26) | Polymer Aqueous solution (13) | 1.26 | 1.23 |
| Black Ink (27) | Polymer Aqueous solution (5) | 1.31 | 1.33 |
| Black Ink (28) | Polymer Aqueous solution (5) | 1.29 | 1.31 |
| Black Ink (29) | Polymer Aqueous solution (14) | 1.31 | 1.35 |
| Black Ink (30) | Polymer Aqueous solution (14) | 1.25 | 1.30 |

TABLE 3-continued

ROD of Prints obtained from Inks

| Ink | Polymer Aqueous solution | ROD on Xerox 4200 | ROD on Canon GF500 |
|---|---|---|---|
| Black Ink (31) | Polymer Aqueous solution (14) | 1.22 | 1.23 |
| Black Ink (32) | Polymer Aqueous solution (15) | 1.32 | 1.30 |
| Black Ink (33) | Polymer Aqueous solution (15) | 1.33 | 1.30 |
| Black Ink (34) | Polymer Aqueous solution (16) | 1.32 | 1.37 |
| Black Ink (35) | Polymer Aqueous solution (5) | 1.38 | 1.40 |
| Black Ink (36) | Polymer Aqueous solution (5) | 1.36 | 1.30 |
| Comparative Black Ink (1) | Comparative Polymer Aqueous Solution (1) | 1.19 | 1.18 |

It was clearly seen from the results that the process according to the first aspect of the present invention and the dispersants according to the second aspect of the present invention facilitate prints having the same or higher optical densities as compared to previously known dispersants.

7. Further Inks

The further inks described in Tables I and II may be prepared wherein Black Millbase (1) and Black Millbase (2) are as mentioned above and the ink additives are as defined below. Numbers quoted in the second column onwards refer to the number of parts of the relevant ingredient and all parts are by weight. The inks may be applied to paper by thermal, piezo or Memjet ink jet printing.

The following abbreviations are used in Tables I and II:
PG=propylene glycol
DEG=diethylene glycol
NMP=N-methylpyrrolidone
DMK=dimethylketone
IPA=isopropanol
MeOH=methanol
2P=2-pyrrolidone
MIBK=methylisobutyl ketone
P12=propane-1,2-diol
BDL=butane-2,3-diol
Surf=Surfynol™ 465 from Air Products
PHO=$Na_2HPO_4$ and
TBT=tertiary butanol
TDG=thiodiglycol
GLY=Glycerol
nBDPG=mono-n-butyl ether of dipropylene glycol
nBDEG=mono-n-butyl ether of diethylene glycol
nBTEG=mono-n-butyl ether of triethylene glycol

TABLE I

| Mill-base | Mill-base Content | Water | PG | DEG | NMP | DMK | NaOH | Na Stearate | IPA | MEOH | 2P | MIBK | GLY | nBDPG |
|---|---|---|---|---|---|---|---|---|---|---|---|---|---|---|
| 1 | 30 | 50 | 5 | | 6 | 3 | | | | | 5 | | 1 | |
| 1 | 30 | 59.8 | | 5 | 5 | | 0.2 | | | | | | | |
| 1 | 40 | 45 | 3 | | 3 | 3 | | | | 5 | 1 | | | |
| 1 | 40 | 51 | | 8 | | | | | | | | 1 | | |
| 1 | 40 | 45.8 | 5 | | | | | 0.2 | 4 | | | 5 | | |
| 1 | 40 | 41 | | | 9 | | 0.5 | 0.5 | | | 9 | | | |
| 1 | 40 | 10 | 4 | 15 | 3 | 3 | | | 6 | 10 | 5 | 4 | | |
| 1 | 40 | 30 | | 20 | | | | | 9 | | | | | 1 |
| 1 | 50 | 25 | 5 | 4 | | 5 | | | | 6 | | 5 | | |
| 1 | 50 | 29.7 | 3 | 5 | 2 | 10 | | 0.3 | | | | | | |
| 2 | 50 | 15 | | 5 | 4 | 6 | | | 5 | 4 | 6 | 5 | | |
| 2 | 50 | 46 | | | | | | | | 4 | | | | |
| 2 | 40 | 50 | 5 | | | | | | 5 | | | | | |
| 2 | 40 | 40 | 2 | 6 | 2 | 5 | | | 1 | | 4 | | | |
| 2 | 40 | 40 | | | 5 | | | | | | 15 | | | |
| 2 | 40 | 44 | | | 11 | | | | | | 5 | | | |
| 2 | 50 | 30 | 2 | | | 10 | | | | 2 | | 6 | | |
| 2 | 50 | 39.7 | | | 7 | 0.3 | | | 3 | | | | | |
| 2 | 40 | 29 | 2 | 20 | 2 | 1 | | | | | 3 | 3 | | |
| 2 | 40 | 51 | | | 4 | | | | | | 5 | | | |
| 2 | 40 | 40 | | | | | | | | | | | 20 | |
| 2 | 40 | 40 | | | | | | | | | | | | 20 |

TABLE II

| Mill-base | Mill-base content | Water | PG | DEG | NMP | Surf | TBT | TDG | BDL | PHO | 2P | P12 | nBDEG | nBTEG |
|---|---|---|---|---|---|---|---|---|---|---|---|---|---|---|
| 1 | 30 | 49.8 | 15 | | | 0.2 | | | | | 5 | | | |
| 1 | 30 | 58.8 | | 5 | | | | | | 1.2 | 5 | | | |
| 1 | 40 | 44.6 | 5 | 5 | | 0.1 | 4 | 0.2 | | | | | | 1 |
| 1 | 40 | 5 | | 6 | 4 | 5 | | | | 0.12 | | | | |
| 1 | 40 | 49.8 | 4 | 8 | | | | | | | 6 | | | |
| 1 | 40 | 8 | | | 10 | 0.3 | | | 5 | 0.2 | | | | |
| 1 | 50 | 41.7 | | 5 | 5 | | | 0.3 | | | | | | |
| 1 | 50 | 44.8 | | 10 | 4 | | | | 1 | | 4 | 11 | | |
| 1 | 40 | 39.7 | 4 | 10 | 3 | | | | 2 | | 6 | | | |
| 1 | 40 | 20 | | | 6 | | | | | | 3 | | | |
| 2 | 40 | 35 | | 9 | 7 | | 2 | | | 0.95 | 5 | | 1 | |
| 2 | 40 | 51 | 5 | 11 | | | | | | | 6 | | | |
| 2 | 50 | 35.0 | | | 7 | | | | | | 7 | | | |
| 2 | 50 | 5 | 5 | 5 | 4.1 | | 0.2 | 0.1 | 5 | 0.1 | 5 | | | |
| 2 | 40 | 38 | | | 10 | 1 | | | | | | | | |
| 2 | 40 | 36 | | | | | | 10 | | | | | | |

TABLE II-continued

| Mill-base | Mill-base content | Water | PG | DEG | NMP | Surf | TBT | TDG | BDL | PHO | 2P | PI2 | nBDEG | nBTEG |
|---|---|---|---|---|---|---|---|---|---|---|---|---|---|---|
| 2 | 30 | 24.5 | | | 5 | | | 12 | | 5 | | | | |
| 2 | 30 | 50 | 2 | | 8 | | | 15 | | 5 | | | | |
| 2 | 40 | 50 | | | | | | 8 | | 12 | | | | |
| 2 | 40 | 48 | 10 | | | | | | | | | | 10 | |
| 2 | 40 | 40 | | | | | | | | | 10 | | | 10 |

The invention claimed is:

1. A process for ink jet printing an image on a substrate comprising applying to the substrate a composition comprising
    a liquid medium,
    a pigment and
    a polymer comprising a chain of the Formula (1) or a salt thereof:

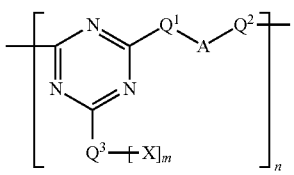

Formula (1)

wherein:
   each X independently is an alkyl, aryl, or heterocyclyl group each of which may be optionally substituted;
   each $Q^1$ and $Q^2$ independently is $NR^1$, O or S; wherein each $R^1$ independently is H or an optionally substituted alkyl, aryl or heterocyclyl group;
   each A independently is an optionally substituted divalent organic linking group;
   n is from 2 to 1,000;
   each m independently is 1 or 2;
   in each case when m is 1, $Q^3$ independently is $NR^1$, O or S and each $R^1$ independently is H or an optionally substituted alkyl, aryl or heterocyclyl group; and when m is 2, $Q^3$ is N; and the polymer having a chain of Formula (1) or salt thereof has been used to comminute the pigment.

2. A process according to claim 1 wherein each A is independently selected from the group consisting of $C_{2\text{-}30}$ alkylene, a phenylene, a naphthylene and a xylylene, each of which may be optionally substituted.

3. A process according to claim 1 wherein at least one A group is selected from the group consisting of $(CH_2)_4$, $(CH_2)_6$ and p-xylylene.

4. A process according to claim 1 wherein all the groups represented by $Q^1$ and $Q^2$ are $NR^1$.

5. A process according to claim 1 wherein the chain has at least one water-dispersing group in its structure.

6. A process according to claim 5 wherein at least one of the water-dispersing group(s) is a phosphorus containing acid.

7. A process according to claim 6 wherein the phosphorus containing acid is selected from the group consisting of phosphoric acid, phosphonic acid and salts thereof.

8. A process according to claim 5 wherein at least one of the water-dispersing group(s) is attached to an X group.

9. A process according to claim 1 wherein at least one of the groups represented by $-Q^3(X)_m$ is of the formula $-NHCH_2PO_3H_2$ or $-N(CH_2PO_3H_2)_2$.

10. A process according to claim 1 wherein the comminution is by microfluidizing, ultrasonication, homogenisation or milling.

11. A process according to claim 1 wherein the liquid medium is an aqueous liquid medium.

12. A process according to claim 1 wherein the liquid medium comprises water and a water-miscible organic liquid in a weight ratio of 95:5 to 50:50.

* * * * *